May 17, 1960
P. H. CRAIG
2,937,351
MAGNETIC AMPLIFIER
Filed Feb. 13, 1956
FIG. 1
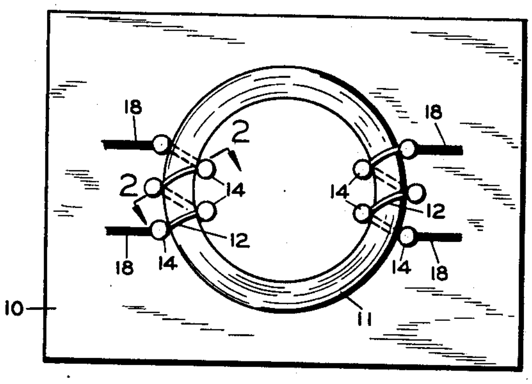
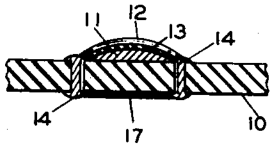
FIG. 2
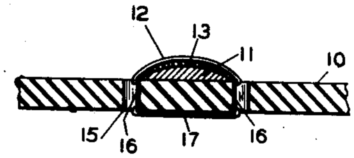
FIG. 3
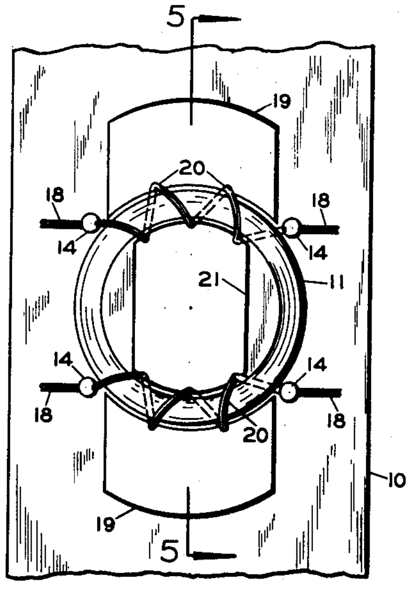
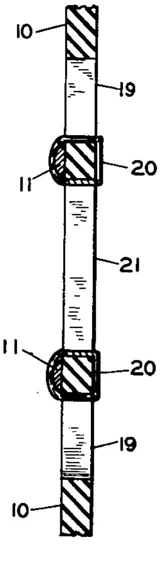
FIG. 5
FIG. 4
INVENTOR.
PALMER H. CRAIG
BY
Salvatore G. Militana
ATTORNEY United States Patent Office 2,937,351
Patented May 17, 1960

2,937,351

MAGNETIC AMPLIFIER

Palmer H. Craig, Coral Gables, Fla.

Application February 13, 1956, Serial No. 565,192
2 Claims. (Cl. 336—200)

This invention relates to a process for manufacturing magnetic amplifiers.

Such magnetic amplifiers comprise, in general, a magnetic core material having two or more windings so placed thereon that direct current in the saturating (input) winding produces partial or complete saturation of the core, changing the effective inductance of the power (output) winding and thereby varying the amount of alternating current passed by that winding.

Other devices, particularly radio tubes and transistors, are commonly used as amplifiers of audio and radio frequencies. As compared with such devices, magnetic amplifiers are extremely rugged, will last almost indefinitely, require no warm-up time or filament or cathode current, will respond to extremely high frequencies and will withstand much higher temperatures. In addition, they can be made to have magnetic memory not possessed by either vacuum tubes or transistors. For these reasons, magnetic amplifiers are used in computers, switching devices, servo systems, and in numerous other devices.

The present manner of manufacturing magnetic amplifiers is to first produce ferrite cores by mixing iron oxide powders with other components such as nickel oxide, then pressing this mixture into a toroidal or other desirable shapes and sintering the shaped material in the presence of oxygen. After the cores have been produced, coils of insulated wire are wound thereon by a rather difficult winding operation requiring special winding machines, the number of turns, windings, etc. being determined by the characteristics desired of the magnetic amplifier being produced. As can be readily seen, the magnetic amplifiers produced by this method are expensive, too costly to be used as a substitute for relatively inexpensive radio tubes and transistors and are used only in those circuits or devices in which only magnetic amplifiers may be used. As a result, magnetic amplifiers are used today in guided missiles and computers where cost is of secondary importance.

The present invention contemplates the manufacture of magnetic amplifiers which are inexpensive in cost and susceptible of mass production methods whereby large quantities of these amplifiers may be produced simultaneously. A suitable core or a plurality of cores, as many as desired toroidal in shape or otherwise, is first deposited by an electroplating process on a backing plate made of insulating material. This process requires an electrolyte or electroplating bath having a capability of depositing cores of nickel-iron or other suitable alloy, the composition of said electrolyte forming a part of this invention. After the cores have been formed, windings are then wound or deposited thereon, or a conductive paint applied on the cores in a manner described in detail hereinafter.

Therefore, a principal object of the present invention is to produce magnetic amplifiers by a novel method of electro-depositing the cores in an electroplating operation whereby from a single to hundreds or thousands of such units may be produced simultaneously.

A further object of the present invention is to provide magnetic amplifiers described as above wherein an electrolyte of certain composition is utilized, which results in the depositing of cores having the desired iron and nickel content.

A further object of the present invention is to provide a method of manufacturing magnetic amplifiers which are light in weight, rugged in construction and inexpensive in cost.

A still further object of the present invention is the provision of a method of manufacturing magnetic amplifiers characterized as above which may be used in radio and television circuits, computers, servo systems, switching devices, etc., and can serve as memory devices in mechanisms requiring such a characteristic.

With these and other objects in view, as will appear hereinafter, my invention consists of certain combinations and processes as will be hereinafter described in detail in connection with the accompanying drawing and particularly set forth in the appended claims.

In the drawing:

Figure 1 is a plan view of a normal toroidal core mounted on a backing plate.

Figure 2 is a sectional view taken along the line 2—2 of Figure 1.

Figure 3 is a similar view to that of Figure 2 showing a modified form of my magnetic amplifier.

Figure 4 is a top plan view of a still further modification of the invention.

Figure 5 is a sectional view taken along the line 5—5 of Figure 4.

As in the normal electroplating and electro depositing processes there are required an electrolytic bath, a cathode, an anode, and a source of electrical energy whereby a flow of ions is created carrying a metallic deposit of desired characteristic from the anode to the cathode. For depositing an alloy of approximately 40% iron and 60% nickel at the cathode, an electrolyte comprising of the following has been found effective.

| | G./l. |
|---|---|
| Nickelous sulfate, crystals | 180–200 |
| Nickelous chloride, crystals | 40– 80 |
| Ferrous fluorborate | 2– 40 |
| Boric acid | 20– 40 |
| Suitable wetting agent. | |

Examples of a suitable wetting agent are sodium lauryl sulphate, or photographic wetting agents manufactured by Eastman Kodak Co., or wetting agents manufactured by Monsanto Chemical Co. In general sulfonic acids of their salts prepared from aromatic petroleum compounds, alkylated with monochlorinated kerosene, and in turn sulfonated may be used.

The pH of the above solution should be 2.5 to 3.5 and it should be used at a temperature of 50 to 60 degrees centigrade. Ferrous sulphate crystals can be used instead of the ferrous fluoroborate, using the same concentrations. To obtain higher percentages of iron in the iron-nickel alloy which is being plated, use higher concentrations of the ferrous salt. When using ferrous sulphate, add 15 g./l. of nickel fluoroborate to assist in keeping any ferric iron formed in solution as a complex. The wetting agent is used to prevent pitting of the deposit. Higher rates of deposition can be obtained by omitting the nickel sulfate and using sufficient nickel chloride to make the same total nickel content. The bath should be treated with activated carbon in a quantity of approximately 4 g./l. of solution, and the solution filtered to remove the carbon. This is to remove harmful organic materials, which may be present in case the formula is compounded from technical grade materials. The higher the iron percentage the harder it is to keep the bath in balance.

Anodes should be an alloy of iron-nickel in the same ratio as that desired in the plated material. The anode should be bagged in cotton or synthetic fabric sacks which have been thoroughly washed to remove organic materials Udylite #3 nickel brightener, in a concentration of about 0.8 oz./gal. may be added to the bath, having a tendency to strengthen the deposit and give it a brighter finish, but this ingredient is not essential.

My invention allows the use of different techniques for producing different and special types of amplifiers. Referring to Figure 1, which depicts a typical toroidal core 11, I begin with an insulated plastic backing plate 10 which is then coated with a conductive material, such as copper, silver, graphite or other conductive materials. The booklet "Printed Circuit Techniques" which is National Bureau of Standards Circular, 468, published by the U.S. Department of Commerce, gives on pages 23 and 24 several suitable techniques for the chemical deposition of conductive coatings on insulating plates, and on pages 24–26 suitable methods for depositing such conductive coatings by vacuum processes, cathodic sputtering and evaporation are given. By the use of the aforementioned electrolytic bath, a core 11 is then deposited on this backing plate either through a template which limits the deposit to the shape and size wanted or by means of a temporary masking film of a suitable kind, such as paraffin, with spaces left where the deposit is wanted. After the deposition of the core 11, in some cases it may be desirable to remove the conducting material, namely, the cathode which was used for electro-plating purposes. This is done by placing a suitable insulating backing plate over the top of the deposited cores (assuming a large number of cores were deposited simultaneously), such backing plate having been covered with some suitable cement or adhesive, normally one of the commonly used plastic cements. The deposited cores will adhere thereto after the cement dries. Then the new backing plate carrying the deposited cores is separated from the original backing plate and the graphite is dusted or removed therefrom by selective chemical baths which will remove such conductive materials without removing the deposited core material. There is now left an insulator plate on which there is affixed the deposited cores in whatever shape and size desired. This shape and size have, of course, been controlled by the original template or masking technique. Any paraffin remaining on the cores 11 are removed by immersion in benzene or other suitable solvent. After the deposition of the core 11, an insulating film 13 is placed thereon as by spraying an acrylic resin (plastic) over the desired area.

The next step in the present process is the depositing of windings on core 11. By using a masking technique a suitable conductive paint is painted or sprayed on the cores in the form of individual wires. In this operation a series of parallel conductive paths or wires 11 are positioned on the cores slightly departing from a perpendicular to the axis of the core on which they are being placed. There will be as many of these parallel wires as there are to be turns on this winding. These wires extend over the edge of the core and then terminate either in a rivet 14 (see Figure 3) extending through the insulating backing plate 10 or in a hole 15 (see Figure 3) formed at that point, there being a hole 15 or rivet 14 for each terminal of each turn of such wire 12. Thus if there were to be 100 turns in that winding, there would be 200 such holes or rivets, all being formed with one operation. In the case of the rivets 14, as shown by Figure 2, the turns make contact electrically with the rivets 14. In the case of the holes, as shown by Figure 3, these holes 15 can be treated with conductive paint, so that there is a conductive path 16 from front surface to the rear surface of the insulating backing plate, such path being confined, of course, to that particular spot, there being in the case of 100 turns, 200 such conductive paths. Now the backing plate is turned over and another series of such turns or wire 17 deposited on the opposite side, each making contact electrically with the conductive holes 15 or rivets 14 in the plate 10, so that these wires form the other side of the turns. The template or masking techniques should, of course, include a connecting lead from each end of such a coil, or the coil could be tapped at any desired place, by a connecting lead being placed there. Electroplating techniques could, of course, be substituted for the conductive paint. In the instance where the plated alloy is of high electrical resistance it may not be necessary to insulate the core before applying the windings, but it has been found necessary in most instances to insulate the core before the windings are applied. This can easily be done by applying an insulating varnish, lacquer, plastic or other suitable coat on the core before starting to apply the windings.

Windings may be applied in the conventional manner as illustrated by Figures 5 and 6 wherein bobbins or winding devices are used for winding calls of insulated wires 20 about the closed cores 11. In this instance, the backing plate 10 is slotted or provided with openings 19, 19 and 21 adjacent the outer and inner sides respectively of the core 11. The openings 19, 20 are sufficiently large to permit the bobbin to fit therethrough as the windings 20 are positioned on the core 11.

Many windings can be deposited or painted on simultaneously. Successive layers of core, insulated from one another, may be easily produced and each such core layer may be extremely thin, thus lowering losses and making the use of very high frequencies feasible. Successive layers of windings each insulated from the other may be also be employed. The present method allows the magntic amplifier thus made to be a memory device if so desired, and a wide variety of formulas in the core is available by the use of suitable baths in the electroplating operation and the use of anodes composed of desired alloys.

Also, all of the magnetic amplifiers required in a given circuit such as a radio, television and the like may be formed by the present method on a single backing plate. Consequently, large numbers of these backing plates can be made simultaneously thereby reducing the cost thereof and making available large quantities of the magnetic amplifiers.

Having described my invention, what I claim as new is;

1. A magnetic amplifier adapted for miniaturization circuits, comprising a backing plate of insulation material, a coating of a suitable core material deposited on said backing, said plate having perforations along the sides of said core material, at least one continuous coil around said core material composed of spaced half-turns of coated conducting material over said core coating and complementary half-turns of coated conductor material on reverse side of said backing plate, and conducting material in said perforations joining the successive half-turns on opposite sides of said plate to form said continuous coil.

2. A magnetic amplifier as defined in claim 1, said conducting material in said perforations comprising rivets filling said perforations.

(References on following page)

References Cited in the file of this patent

UNITED STATES PATENTS

| | | |
|---|---|---|
| 1,965,649 | Jaumann | July 10, 1934 |
| 1,988,734 | Helgason | Jan. 22, 1935 |
| 2,442,628 | Wesley et al. | June 1, 1948 |
| 2,474,988 | Sargrove | June 5, 1949 |
| 2,511,230 | Wald | June 13, 1950 |
| 2,567,934 | Green et al. | Sept. 18, 1951 |
| 2,654,142 | Horelick | Oct. 6, 1953 |
| 2,703,854 | Eisler | Mar. 8, 1955 |

OTHER REFERENCES

"Printed Circuit Techniques," National Bureau of Standards Circular 468, November 15, 1947, pp. 17 and 18.

"New Advances in Printed Circuits," National Bureau of Standards Miscellaneous Publication 192, November 22, 1948, pp. 39 and 40.

"Magnetic Ferrites—Core Materials for High Frequencies," Electrical Manufacturing, December 1949, pp. 86–91.